US009882714B1

(12) United States Patent
Cignetti et al.

(10) Patent No.: US 9,882,714 B1
(45) Date of Patent: Jan. 30, 2018

(54) METHOD AND APPARATUS FOR ENHANCED DISTRIBUTION OF SECURITY KEYS

(71) Applicant: Certes Networks, Inc., Pittsburgh, PA (US)

(72) Inventors: Todd L. Cignetti, Ashburn, VA (US); Miles S. Krivoshia, Pittsburgh, PA (US); Ganesh Murugesan, Bangalore (IN); Timothy J. Megela, McMurray, PA (US)

(73) Assignee: Certes Networks, Inc., Pittsburgh, PA (US)

( * ) Notice: Subject to any disclaimer, the term of this patent is extended or adjusted under 35 U.S.C. 154(b) by 0 days.

(21) Appl. No.: 14/203,542

(22) Filed: Mar. 10, 2014

Related U.S. Application Data (60) Provisional application No. 61/802,324, filed on Mar. 15, 2013.

(51) Int. Cl.
*H04L 9/08* (2006.01)
*H04L 29/06* (2006.01)
*H04W 12/04* (2009.01)
*G06F 12/14* (2006.01)

(52) U.S. Cl.
CPC ............ *H04L 9/0816* (2013.01); *H04L 9/083* (2013.01); *H04L 9/088* (2013.01); *H04L 9/0819* (2013.01); *H04L 9/0891* (2013.01); *H04L 63/062* (2013.01); *H04L 63/065* (2013.01); *H04L 63/068* (2013.01)

(58) Field of Classification Search
CPC ... H04L 63/068; H04L 63/062; H04L 63/065; H04L 9/088; H04L 9/083; H04L 9/0891; H04L 9/0819
See application file for complete search history.

(56) References Cited

U.S. PATENT DOCUMENTS

| | | | | |
|---|---|---|---|---|
| 5,146,497 | A | * | 9/1992 | Bright .......................... 380/273 |
| 5,301,232 | A | * | 4/1994 | Mulford ....................... 380/273 |
| 5,404,403 | A | * | 4/1995 | Bright et al. ................. 380/277 |
| 5,412,722 | A | * | 5/1995 | Sherly et al. ................. 380/273 |

(Continued)

OTHER PUBLICATIONS

"Certes Networks; The TrustNet Difference", Solution Note, SN-TND-032112, 2 pages. (Mar. 21, 2012).

(Continued)

*Primary Examiner* — Michael Simitoski
(74) *Attorney, Agent, or Firm* — Hamilton, Brook, Smith & Reynolds, P.C.

(57) ABSTRACT

In many secure communication systems, group keys are updated on a regular basis in order to maintain high security level. Decryption and encryption keys are typically updated simultaneously in policy enforcement points (PEPs). Such approach makes the respective communication system prone to dropping of network traffic. According to at least one embodiment, re-keying is performed by installing, at a first phase, a new decryption key at the PEPs without removing an old decryption key previously installed in the PEPs. At a second phase, a new encryption corresponding to the new decryption key is installed and an old encryption key corresponding to the old decryption is removed. At a third stage, the old decryption key and any other old decryption keys are removed from the PEPs.

11 Claims, 5 Drawing Sheets

(56) References Cited

U.S. PATENT DOCUMENTS

| | | | | |
|---|---|---|---|---|
| 5,706,348 | A * | 1/1998 | Gray | H04L 9/0891 380/260 |
| 5,768,380 | A * | 6/1998 | Rosauer et al. | 380/273 |
| 6,157,723 | A * | 12/2000 | Schultz | 380/273 |
| 6,212,280 | B1 * | 4/2001 | Howard et al. | 380/279 |
| 6,295,361 | B1 * | 9/2001 | Kadansky | H04L 29/06 380/273 |
| 6,950,522 | B1 * | 9/2005 | Mitchell | H04L 9/083 370/389 |
| 7,266,201 | B1 * | 9/2007 | Lin | H04L 9/32 380/277 |
| 7,961,884 | B2 * | 6/2011 | Edgett et al. | 380/277 |
| 8,452,015 | B2 * | 5/2013 | Gassoway | 380/278 |
| 8,634,560 | B1 * | 1/2014 | Ng et al. | 380/273 |
| 8,724,815 | B1 * | 5/2014 | Roth et al. | 380/270 |
| 8,908,868 | B1 * | 12/2014 | Baer | G06F 21/6209 380/277 |
| 8,995,667 | B2 * | 3/2015 | Chunduri et al. | 380/277 |
| 2002/0071430 | A1 * | 6/2002 | Szyszko | 370/389 |
| 2002/0154782 | A1 * | 10/2002 | Chow et al. | 380/278 |
| 2003/0002680 | A1 * | 1/2003 | Akiyama et al. | 380/278 |
| 2003/0219129 | A1 * | 11/2003 | Whelan et al. | 380/270 |
| 2004/0105542 | A1 * | 6/2004 | Takase et al. | 380/44 |
| 2004/0105549 | A1 * | 6/2004 | Suzuki et al. | 380/273 |
| 2005/0047598 | A1 * | 3/2005 | Kruegel | 380/264 |
| 2005/0138352 | A1 * | 6/2005 | Gauvreau | H04L 9/3247 713/153 |
| 2006/0291662 | A1 * | 12/2006 | Takahashi | H04L 9/083 380/278 |
| 2006/0291664 | A1 * | 12/2006 | Suarez et al. | 380/286 |
| 2007/0064934 | A1 * | 3/2007 | Batcher et al. | 380/44 |
| 2007/0076886 | A1 * | 4/2007 | Hori et al. | 380/277 |
| 2007/0160063 | A1 * | 7/2007 | Mynam et al. | 370/395.52 |
| 2007/0209071 | A1 * | 9/2007 | Weis | H04L 63/062 726/15 |
| 2007/0253554 | A1 * | 11/2007 | Chesson | H04L 63/068 380/273 |
| 2007/0280481 | A1 * | 12/2007 | Eastlake et al. | 380/277 |
| 2008/0040775 | A1 * | 2/2008 | Hoff et al. | 726/1 |
| 2008/0072282 | A1 * | 3/2008 | Willis et al. | 726/1 |
| 2008/0080713 | A1 * | 4/2008 | Cho | H04L 9/0822 380/273 |
| 2008/0082823 | A1 * | 4/2008 | Starrett et al. | 713/171 |
| 2009/0037736 | A1 * | 2/2009 | Djordjrvic | H04L 63/062 713/170 |
| 2009/0092252 | A1 * | 4/2009 | Noll et al. | 380/277 |
| 2009/0245518 | A1 * | 10/2009 | Bae et al. | 380/273 |
| 2009/0245519 | A1 * | 10/2009 | Cachin et al. | 380/277 |
| 2009/0276629 | A1 * | 11/2009 | Wu et al. | 713/175 |
| 2009/0316909 | A1 * | 12/2009 | Futa | H04L 9/083 380/279 |
| 2010/0189014 | A1 * | 7/2010 | Hogan et al. | 370/255 |
| 2010/0208898 | A1 * | 8/2010 | Acar et al. | 380/280 |
| 2010/0278336 | A1 * | 11/2010 | Tahan | G06F 21/606 380/46 |
| 2011/0016319 | A1 * | 1/2011 | Lundberg | G06F 21/83 713/170 |
| 2011/0150223 | A1 * | 6/2011 | Qi et al. | 380/273 |
| 2011/0271110 | A1 * | 11/2011 | Ohba et al. | 713/168 |
| 2012/0159173 | A1 * | 6/2012 | Peterka et al. | 713/171 |
| 2012/0243683 | A1 * | 9/2012 | Oba et al. | 380/255 |
| 2013/0036305 | A1 * | 2/2013 | Yadav et al. | 713/168 |
| 2013/0223622 | A1 * | 8/2013 | Sowa et al. | 380/33 |
| 2013/0243197 | A1 * | 9/2013 | Sherwood et al. | 380/277 |
| 2014/0229739 | A1 * | 8/2014 | Roth et al. | 713/189 |
| 2015/0156181 | A1 * | 6/2015 | kerberg | H04L 9/0833 726/6 |

OTHER PUBLICATIONS

"Certes Networks; Certes TrustNet Manager™, Group Encryption Management for Policies, Keys and Devices", Product Brochure BR-TNM-041212, 6 pages. (Apr. 12, 2012).

"Certes Networks; Certes TrustNet Manager™, Group Encryption Management for Policies, Keys and Devices", DataSheet DS-TNM-041212, 2 pages. (Apr. 12, 2012).

Certes Networks, Inc., TNM v3.4 with CEP 10, CEP 100, CEP 1000, and CEP 10G VSEs Running CEP v2.1.1 Firmware, Sequrity Target Version 1.2, 55 pages (Nov. 21, 2012).

* cited by examiner

METHOD AND APPARATUS FOR ENHANCED DISTRIBUTION OF SECURITY KEYS

RELATED APPLICATION

This application claims the benefit of U.S. Provisional Application No. 61/802,324, filed on Mar. 15, 2013. The entire teachings of the above application(s) are incorporated herein by reference.

BACKGROUND OF THE INVENTION

In a variety of applications, secure communication of data is achieved through data encryption. Data encryption and the exchange of encrypted data by a plurality of network entities is usually implemented using key cryptography. In key cryptography, secret keys are distributed to the different network entities. The secret key enables the associated network entity to encrypt data to be sent from that network entity or to decrypt data received by the network entity.

SUMMARY OF THE INVENTION

Embodiments of the present invention address fail safe key update or re-keying in secure networks.

According to at least one embodiment, a method and corresponding apparatus for updating security keys in a plurality of policy enforcement points (PEPs) comprises the following steps or operative elements. The method/apparatus causes one or more PEPs of the plurality of PEPs to support decryption using a new decryption key while still supporting decryption using an old decryption key previously installed in the plurality of PEPs. The supporting of both old and new decryption keys together (or overlapping) is for a period of time. Upon a first criterion being met, the method/apparatus causes at least one PEP to update an old encryption key, that corresponds to the old decryption key, with a new encryption key that corresponds to the new decryption key. Upon a second criterion being met, the method/apparatus instructs the plurality of PEPs to halt support of decryption using the old decryption key previously installed in the plurality of PEPs.

In order to cause the one or more PEPs to support decryption using the new decryption key while still supporting decryption using the old decryption keys, the method/apparatus may send the new decryption key to the plurality of PEPs or may send an instruction to install the new decryption key to the plurality of PEPs. The first criterion may be receipt of an acknowledgement from each PEP of the one or more PEPs indicating that the new decryption key is installed therein. Alternatively, the first criterion may be a given time interval being elapsed since sending the new decryption key, or since sending instruction to install the new decryption key to the one or more PEPs. The second criterion may be receipt of an acknowledgement from each PEP of the at least one PEPs indicating that the new encryption key is installed therein, or may be a time-based criterion defined in terms of given time instance or given time interval. In causing at least one PEP to update the old encryption key with the new encryption key, a key server is configured to send the new encryption key to the plurality of PEPs or send instruction to install the new encryption key to the plurality of PEPs.

According to at least one other embodiment, a method and corresponding apparatus for updating security keys in a policy enforcement point (PEP) comprises: installing at a first time instant a new decryption key without uninstalling an old decryption key previously installed in the PEP; updating at a second time instant, later than the first time instant, an old encryption key, corresponding to the old decryption key, with a new encryption key corresponding to the new decryption key; and halting support of decryption using the old decryption key at a third time instant, the third time instant being later than the second time instant.

The PEP receives the new decryption key and the new encryption key from a server. Upon installing the new decryption key, the PEP may send an acknowledgement of installation of the new decryption key to a server. In updating the old encryption key with the new encryption key, the PEP may receive an instruction to update the old encryption key with the new encryption key and may update the old encryption key with the new encryption key in response to the received instruction. Upon updating the old encryption key with the new encryption key, the PEP may send acknowledgement to a server indicating that the update of the old encryption key with the new decryption key is performed.

In updating the old encryption key with the new encryption key, the PEP installs the new encryption key and removes or un-installs the old encryption key. Halting support of decryption using the old decryption key may include receiving an instruction from a server to halt support of decryption using the old decryption key and halting support of decryption using the old decryption key in response to the received instruction. In halting support of decryption using the old decryption key, the PEP removes the old decryption key. Upon halting support of decryption with the old decryption key, the PEP may send an acknowledgement to a server indicating that support of decryption using the old decryption key is halted.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

In a secure communication environment involving a plurality of entities, group keys are shared between group users to perform data encryption or data decryption. In broadcast applications, multicast applications, teleconference applications, or the like, group keys are used to encrypt or decrypt data content distributed to the group users.

In order to ensure a high level of security for data exchanged or distributed among a group and prevent third party intrusion, existing secure networks typically perform a key update, or re-keying, according to a pre-defined re-key schedule. In other words, a key server typically distributes new group keys, for example, every given time period to entities, e.g., policy enforcement points (PEPs), in a group to replace previously distributed group keys. Upon receiving the new group keys, a group entity is usually configured to swiftly install the received group keys and removes the old group keys. When old group keys are removed by the entity, the entity is not capable anymore of encrypting or decrypting data based on the removed group keys. One problem with such re-keying approach is that group keys become out of sync if some sites (or entities) get a new key and others do not. In such a case, different sites with different group keys are unable to communicate with each other since data exchanged between them cannot be successfully decrypted. Another problem is that group keys may expire if the key server is not reachable therefore resulting in a network outage.

In many applications or services, it is important to ensure that the network is always up and communication between different entities therein or between different sites is operative. As such, adopting a conventional re-keying approach may not be a wise option. There is an increasing interest in fail-safe group keying with a key distribution approach that does not jeopardize or unnecessarily reduce the uptime of the network. In the following, embodiments of fail-safe rekeying that overcome the problems stated above are presented.

Figure 1:
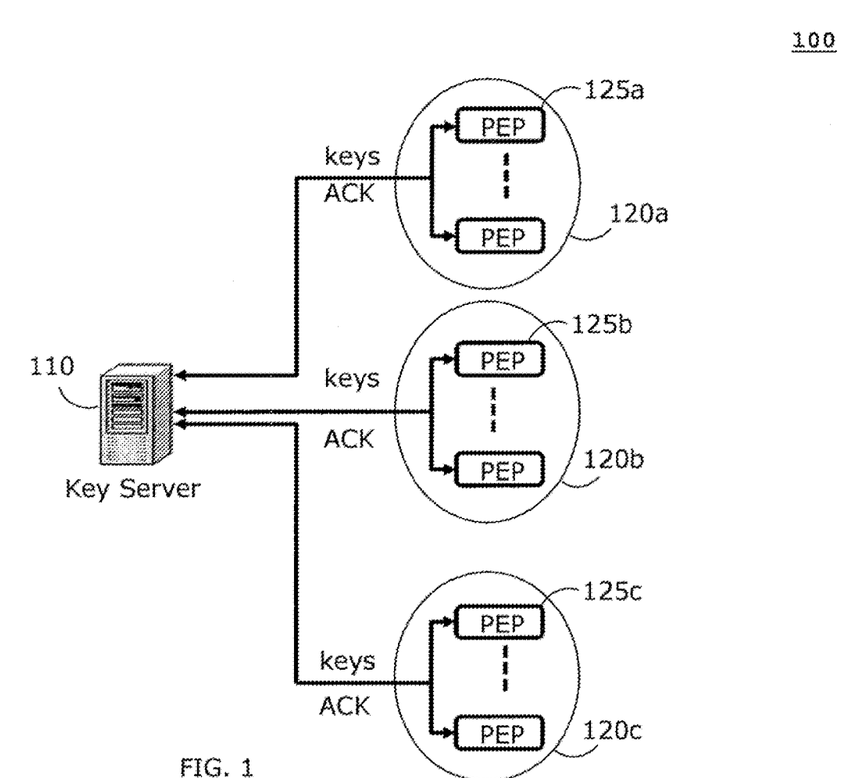
FIG. 1 is a schematic view of a system distributing security keys according to at least one embodiment.

FIG. 1 shows a network diagram illustrating a system 100 for distributing security keys according to at least one embodiment. The system includes a key server 110 configured to manage group key distribution within the system 100. Distributed group keys include encryption keys for use in data encryption and decryption keys for use in data decryption. The system 100 also includes one or more sites, e.g., 120a, 120b, and 120c. Each site (120 generally) includes one or more policy enforcement points (PEPs), e.g., 125a, 125b, and 125c, configured to receive group keys from the key server 110 and enforce data security policies such as encryption and decryption of data. According to at least one embodiment, a multi-phase re-keying approach is employed in the system 100. In the multi-phase re-keying approach, the installation of a new decryption key and the removal of a respective old decryption key in PEPs, e.g., 125a, 125b, and 125c, are performed at different time instances resulting in an overlap period during which PEPs, e.g., 125a, 125b, and 125c, support data decryption using either old or new decryption keys. The overlap period helps prevent situations where keys become out of sync.

Figure 2A:
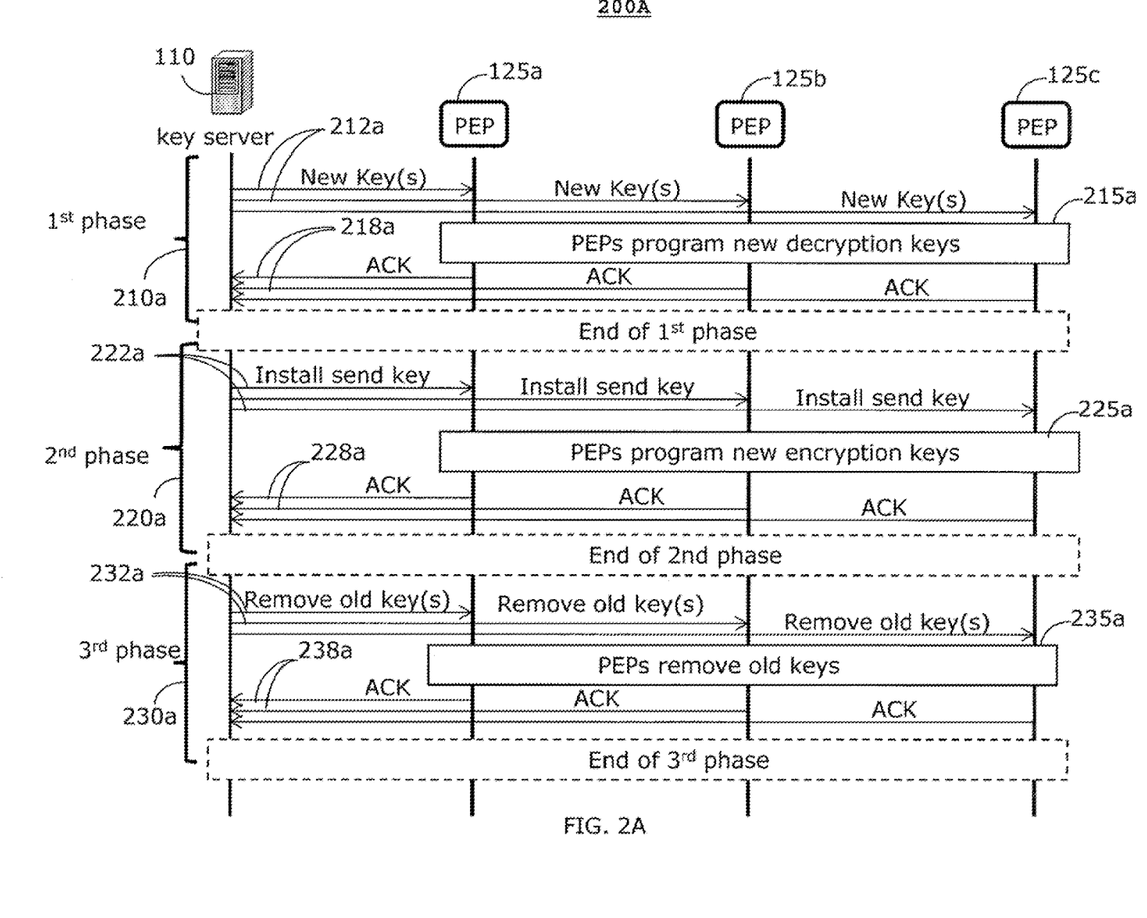
FIGS. 2A and 2B are signaling flowcharts illustrating a multi-phase approach for fail-safe distribution of security keys according to the present invention.

FIG. 2A is a signaling flowchart illustrating a multi-phase re-keying process 200A performed between the key server 110 and the PEPs 125a, 125b, and 125c according to at least a first embodiment. At the start of the re-keying process, an old encryption key and a corresponding old decryption key are assumed to be programmed in the PEPs 125a, 125b, and 125c. The old encryption key and the old decryption key were previously installed, for example, during a previous keying or re-keying process. During a first phase 210a, the key server 110 sends a signal 212a including new a decryption key to PEPs, e.g., 125a, 125b, and 125c, associated with one or more sites, e.g., 120a, 120b and 120c. The signal 212a may further include a new encryption key corresponding to the new decryption key. The signal 212a may be viewed as an instruction to, or may further include a command instructing, the PEPs, e.g., 125a, 125b, and 125c, to install the new decryption key. In response, the PEPs, e.g., 125a, 125b, and 125c, install 215 the new decryption key without un-installing the old decryption key previously installed. At this stage, the PEPs, e.g., 125a, 125b, and 125c, support data decryption using the new decryption key as well as data decryption using the old decryption key. In this way, the PEPs 125a, 125b, and 125c, support data decryption using one of the new decryption key and the old decryption key.

A person skilled in the art should appreciate that the PEPs, e.g., 125a, 125b, and 125c, or the corresponding sites, e.g., 120a, 120b, and 120c, may receive the signal 212a at different time instances. According to at least one embodiment, the key server 110 waits until all pertinent PEPs, e.g., 125a, 125b, and 125c, receive and install the new decryption key before proceeding with further signaling to the PEPs, e.g., 125a, 125b, and 125c. Upon installing the new decryption key at 215a, the PEPs, e.g., 125a, 125b, and 125c, send an acknowledgement (ACK) 218a back to the key server 110. According to at least one embodiment, the server waits until acknowledgements 218a are received from all PEPs, e.g., 125a, 125b, and 125c, served by the key server 110 (i.e., the pertinent PEPs 125a, 125b, and 125c). The first phase 210a ends when the key server 110 receives such acknowledgements from all the pertinent PEPs.

During a second phase 220a, the key server 110 sends a signal 222a to the PEPs, e.g., 125a, 125b, and 125c, to instruct them to install the new encryption key and remove an old encryption key previously installed in the PEPs, e.g., 125a, 125b, and 125c. The signal 222a may include the new encryption key, if it was not previously sent in the signal 212a, a command to install the new encryption key, a command to remove or uninstall the old encryption key, a combination thereof, or the like. Upon receipt of the signal 222a, the PEPs, e.g., 125a, 125b, and 125c, install 225a the new encryption key and remove or uninstall the old encryption key. The new decryption key and the new encryption key correspond to each other. Likewise, the old decryption key and the old encryption key correspond to each other. In other words, data encrypted with the new encryption key may be decrypted only with the new decryption key, and data encrypted with the old encryption key may be decrypted only with the old decryption key.

Upon installing the new encryption key at 225a, the PEPs, e.g., 125a, 125b, and 125c, send acknowledgements (ACK) 228a to the key server 110 confirming the installation of the new encryption key. At this stage, PEPs that installed the new encryption key and removed the old encryption key are capable of decrypting data encrypted with either the old encryption key or the new encryption key, but are capable of encrypting data only with the new encryption key since the old encryption key is already uninstalled or removed. As such, if a particular PEP 125a, b, c, or a particular site 120a, b, c, did not install the new encryption key yet, the particular PEP, or particular site, is still capable of communicating with the other served PEPs. Specifically, such particular PEP, or particular site, is capable of receiving data encrypted with the old encryption key and decrypting said received encrypted data using the old decryption key. That is, keeping the old decryption key programmed/installed in the PEPs, e.g., 125a, 125b, and 125c, after installing the new decryption key ensures the operability of communications between different entities associated with a corresponding network or service even if there is a delay in installing the new group keys in one or more PEPs with respect to other PEPs. The second phase 220a ends when the key server 110 receives acknowledgements 228a from all PEPs, e.g., 125a, 125b, and 125c, served (the pertinent PEPs 125a, b, c).

During a third phase 230a, the key server 110 sends a signal 232a to the PEPs, e.g., 125a, 125b, and 125c, instructing them to remove the old decryption key. At this stage, given that all pertinent PEPs installed the new encryption key and removed the old encryption key as acknowledged 228a at the end of the second phase 220a, there is no point in keeping the old decryption key. Upon receiving the signal 232a, the PEPs, e.g., 125a, 125b, and 125c, remove 235a the old decryption key and any other old group keys, for example, acquired during a non-completed re-keying process. Once the old decryption key and any other old group keys are removed, the PEPs, e.g., 125a, 125b, and 125c, send acknowledgements 238a to the key server 110 confirming the removal of old group keys. The third phase 230a ends when the key server 110 receives acknowledgements 238a from all pertinent PEPs (that is, the PEPs, e.g., 125a, 125b, and 125c, served). The end of the third phase 230a also represents the end of the re-keying process 200A.

In the re-keying process 200A, the criterion employed as indication of the end of the phases 210a, 220a and 230a, or as indication for the key server 110 to execute a following action is the receipt of acknowledgements 218a, 228a, and 238a by the key server 110 from all pertinent PEPs (the PEPs, e.g., 125a, 125b, and 125c, served). Such acknowledgements 218a, 228a and 238a represent confirmations that instructions or group keys sent by the key server 110 were processed and successfully acted upon by the served PEPs, e.g., 125a, 125b, and 125c.

At any phase 210a, 220a, 230a, the key server 110 may take some measures, if no acknowledgement 218a, 228a, 238a respectively is received from a particular PEP or PEPs, e.g., 125a, 125b, or 125c, associated with a particular site, e.g., 120a, 120b, and 120c. The key server 110 addresses such failure in a manner causing the new decryption/encryption key pair to be installed in all pertinent PEPs, e.g., PEPs 125a, 125b, and 125c, served by the key server 110.

According to at least one aspect, embodiments of fail-safe re-keying prevent dropping of network traffic, for example, in the case of: a failure of the key server 110 at a main site, switchover from the key server 110 in the main site to a corresponding key server in a disaster recovery (DR) site, or a cancelled re-keying process by a user. The embodiments of fail-safe re-keying also prevent dropping of network traffic in the case when the key server 110 in the main site and the key server in the DR site experience a communication failure between them and the PEP 125a, b, c is receiving re-keying requests from both servers. In such cases, the challenge is that a given PEP does not know which key to remove because it doesn't know the state of the other PEPs that are participating in the re-keying process. For example, in the case where the first phase 210a is completed, the second phase 220a is partially completed, and a new signal 212a is received by the PEP indicating a new first phase 210a and a new re-keying process, removing either the key(s) associated with the new re-keying process or the key(s) associated with previous incomplete re-keying process risks causing a dropping of network traffic. Specifically, removing the key(s) associated with previous incomplete re-keying process makes the PEP unable to communicate with the site(s) that may still be transmitting with the removed key(s). Removing the key(s) with the new re-keying process makes the PEP unable to communicate with the site(s) that may be transmitting with the key(s) distributed in the new first phase.

The third phase 230a allows overcoming such risks of dropping network traffic by setting specific criteria for when any old keys are to be removed. Specifically, in the third phase 230a, all but the most recent decryption key(s) are discarded. This includes discarding all keys received during a previous partial/incomplete re-keying process. As such, a re-keying process is allowed to fail while still maintaining network traffic. According to at least one embodiment, only after the re-keying process gets to the third phase 230a, is it safe to remove the decryption keys from earlier partial re-keying processes. However, waiting until the third phase 230a to remove keys received during a previous partial re-keying process may result in partial re-keying processes that add state to the PEP device. According to at least one embodiment, PEPs 125a, b, c are configured to account for keys received during partial re-keying processes that may accumulate and consume resources on the respective devices.

Figure 2B:
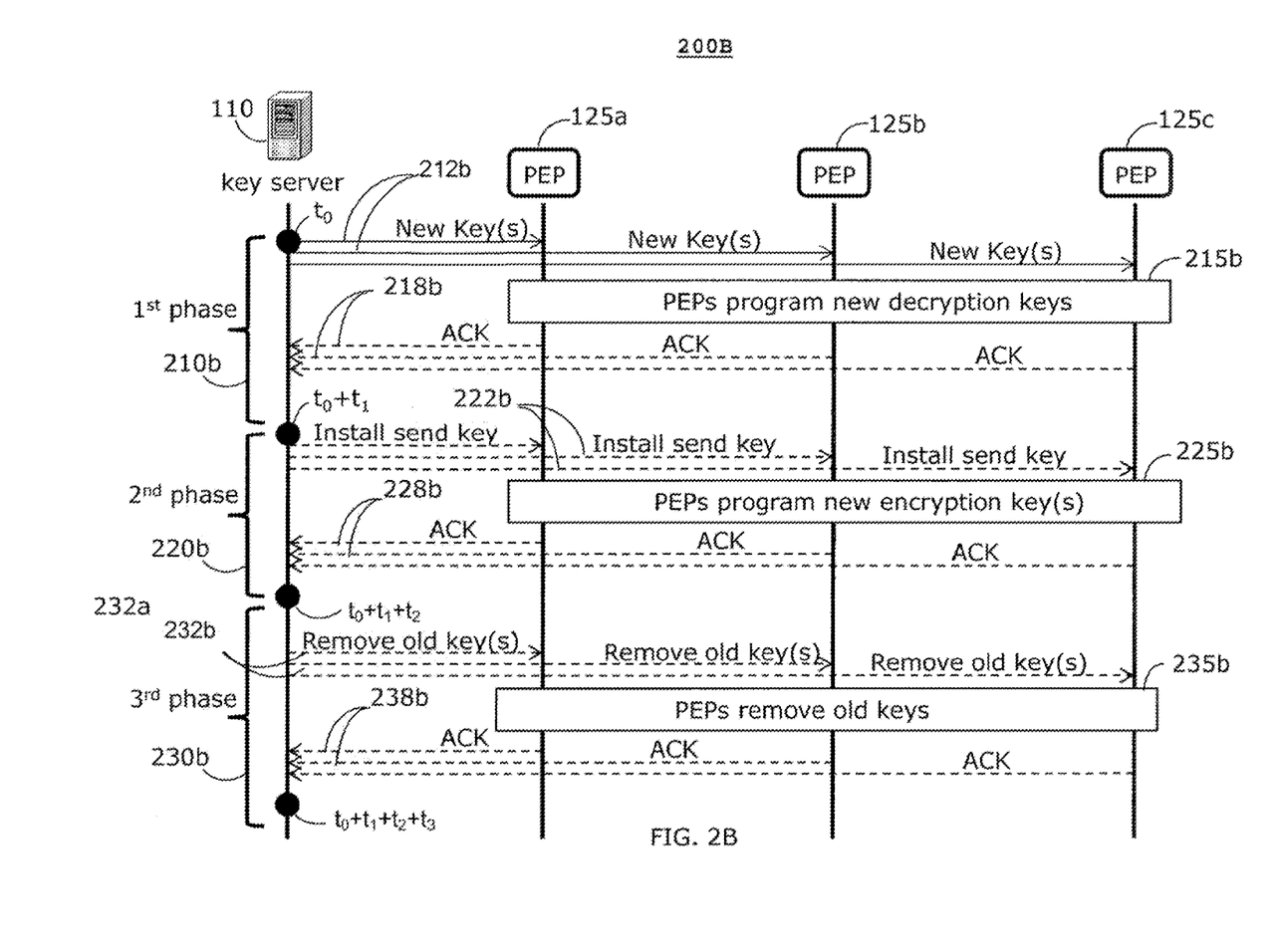

FIG. 2B is a signaling flowchart illustrating a multi-phase re-keying process 200B performed between the key server 110 and the PEPs 125a, 125b, and 125c according to at least a second embodiment. Key server 110 sends signals 212b, 222b and 232b in respective first, second and third phases 210b, 33b, 230b similar to the signals 212a, 222a, 232a described for re-keying process 200A in FIG. 2A above. Likewise, the PEPs 125a, b, c program new decryption keys 215b, program new encryption keys 225b and remove old keys 235b in response to respective signals 212b, 222b, 232b in the pertinent phases 210b, 220b, 230b similar to that described at 215a, 225a and 235a in FIG. 2A for the different phases 210a, 220a, 230a of re-keying process 200A.

Upon installing the new decryption keys 215b in the first phase 210b the PEPs 125a, b, c may send acknowledgements (ACK) 218b back to key server 110. Upon installing the corresponding new encryption keys 225b in the second phase 220b, the PEPs 125a, b, c may send acknowledgements (ACK) 228b to key server 110 confirming the successful installation of the new encryption keys. Upon uninstalling or removing old keys 235b in third phase 230b, the PEPs 125a, b, c may send acknowledgments (ACK) 238b to key server 110. Unlike re-keying process 200A, rekeying process 200B of FIG. 2B does not define the end of the phases 210b, 220b, 230b as a function of the received acknowledgements 218b, 228b, 238b respectively as made clear next.

The re-keying process 200B of FIG. 2B is different from the re-keying process 200A in that the criteria employed as indication of the end of the phases 210b, 220b and 230b are time-based criteria. For example, if the rekeying process 200B and also the first phase 210b thereof start at time $t_0$, the end of the first phase 210b and the start of the second phase 220b may be indicated by the time instance $t_0+t_1$. In other words, the duration of the first phase 210b may be predefined to be equal to $t_1$. If the PEPs, e.g., 125a, 125b, and 125c, are aware of the predefined time duration $t_1$, the acknowledgements 218b may be optional. Also sending the signal 222b may be optional, for example, if the new encryption key was sent to the PEPs, e.g., 125a, 125b, and 125c, in the signal 212b with the new decryption key. In other words, if the PEPs, e.g., 125a, 125b, and 125c, already have received the new encryption key and are aware in advance of the time instance at which the second phase 220b starts, e.g., $t_0+t_1$, they may initiate the installation of the new encryption key at the time instance $t_0+t_1$ or immediately after.

The end of the second phase 220b and the start of the third phase 230b are marked by the time instance $t_0+t_1+t_2$ with the second phase 220b, for example, having a pre-defined duration equal to $t_2$. As such, the acknowledgements 228b may be optional since the start of third phase 230b is independent of the receipt of the acknowledgements 228b by the key server 110. Sending the signal 232b may also be optional if the PEPs, e.g., 125a, 125b, and 125c, are aware in advance of the start time $t_0+t_1+t_2$ of the third phase 230b. In such case, the PEPs, e.g., 125a, 125b, 125c may simply remove 235b the old keys at time $t_0+t_1+t_2$ or right after without any instructions from the key server 110. The end of the third phase 230b is marked by a time instance $t_0+t_1+t_2+t_3$ with, for example, a pre-defined duration of the third phase 230b equal to $t_3$. As such the acknowledgements 238b may be optional since the key server 110 knows when the third phase 230b and the re-keying process 200b ends regardless of whether or not the acknowledgements 238b are received by the key server 110.

The re-keying process 200b also helps reduce the likelihood of dropping network traffic by supporting a time period, e.g., mainly the time period of the second phase 220b, during which the PEPs, e.g., 125a, 125b, and 125c, are enabled to communicate between each other based on security keys distributed during different re-keying processes. In the re-keying process 200b, such time period is constrained by the pre-defined time value(s) or amounts of time unlike the re-keying process 200a. As such, when employing the re-keying process 200b, dropping network traffic due to non-matching security keys between different entities is still a possibility but with a relatively lower probability compared to non-fail-safe approaches. However, by adopting time-based criteria, instead of criteria based on receipt of acknowledgements 218b, 228b, 238b by the key server 110, the re-keying process 200b avoids potential scenarios where some security keys may be in use for a relatively long period, for example, due to a site failure. Such scenarios may result in increased chances of security breaches by outside intruders.

According to at least one embodiment, the key server 110 may be configured to support different approaches of re-keying. For example, a "Fail Safe Rekeying" knob (user controller) may be provided to select between an "Availability" and "Security" settings of the key server 110. As such, if "security" is specified through the user interface, the key server 110 may employ an associated re-keying approach (rekeying process 200b) with, for example, one-minute and five-minute key expiration periods. However, if "availability" is specified by the user, the fail-safe re-keying process 200a is employed. The setting of the key server 110 may be also be configured to provide more than two alternatives of re-keying approaches.

According to at least one embodiment, when a policy is modified, the modified policy is deployed when there is no re-keying process, associated with the modified policy, in progress. In order to quickly deploy a policy change, an operator may cancel a re-keying operation that is in process. However, cancelling an ongoing re-keying operation may leave partial group keys in the PEPs, therefore adding extra state that the PEP 125a, b, c must maintain until the next successful re-keying process. Alternatively, in order to deploy a modified policy when a respective re-keying operation is in progress, the operator may wait until the respective re-keying operation is completed and then deploy the modified policy before starting a new re-keying operation. The management of the deployment of the modified policy may also be handled by using the TNM NB API to wait until the re-keying operation is completed and then deploy the new policy.

The semantics of the rekey interval for the policy will not change. A one hour rekey frequency interval means that the system will try to distribute a new key to all PEPs in the policy every hour. If the rekey is not delayed by failures and the system has enough capacity, then the rekey will be completed within the frequency interval period and a new rekey will be started at the next interval. The rekey process may be delayed by failures and so the system may not be able to successfully complete the rekey on time for every period. After the rekey process does finally complete, the next rekey will be attempted at the next scheduled interval.

Figure 3:
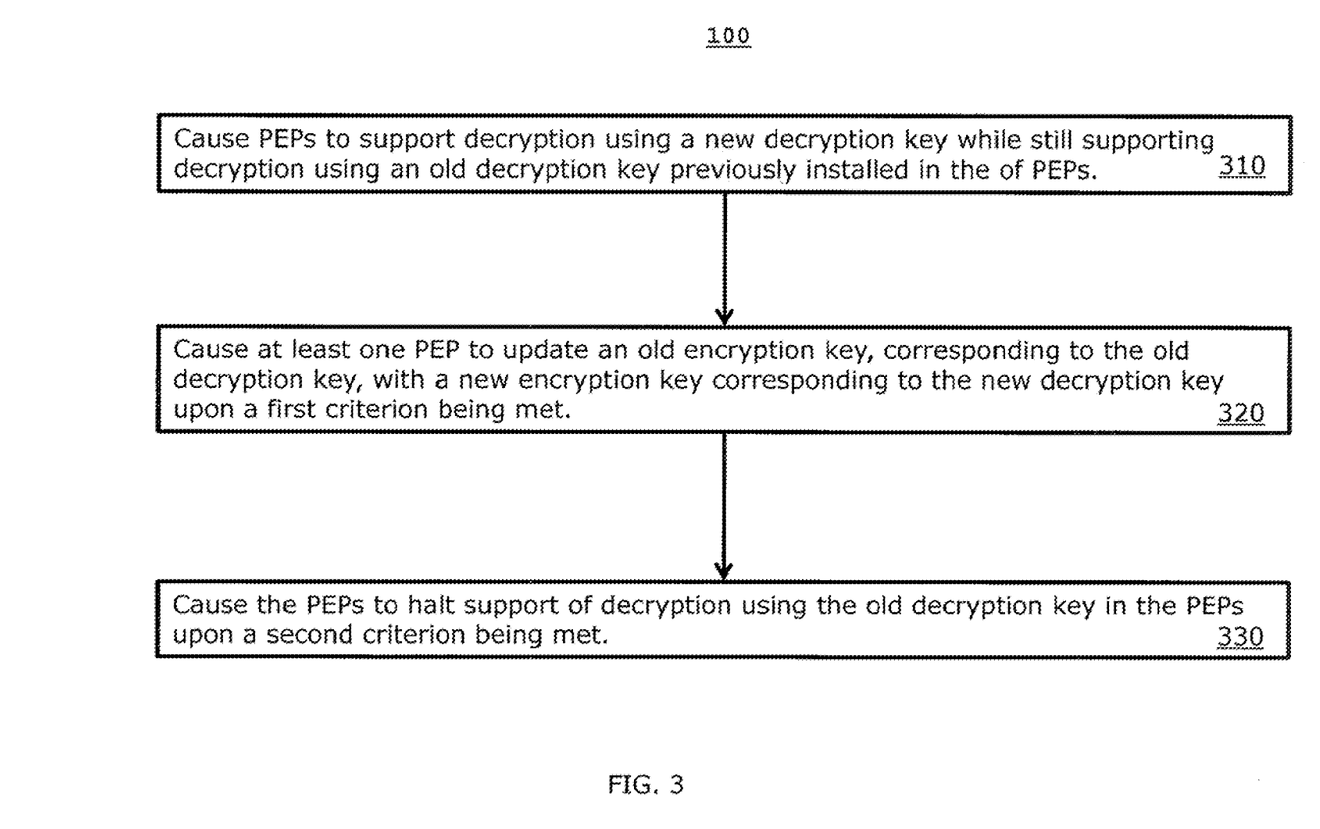
FIG. 3 is a flowchart illustrating a method of updating security keys in a plurality of policy enforcement points (PEPs) according to at least one embodiment.

FIG. 3 is a flowchart illustrating a method of updating group security keys in a plurality of PEPs by the key server 110. At block 310, the key server causes the PEPs, e.g., 125a, 125b, and 125c, to install a new decryption key without un-installing a respective old decryption key previously installed. Causing the PEPs, e.g., 125a, 125b, and 125c, to install the new decryption key may be achieved by sending the new decryption key, instruction to install the new decryption key, a combination thereof, or the like, to the PEPs, e.g., 125a, 125b, and 125c.

The key server 110 then causes the PEPs, e.g., 125a, 125b, and 125c, at block 320 to install a new encryption key and remove the respective old encryption key when a first criterion is met. The first criterion may be the receipt of acknowledgements from all served PEPs that the new decryption key is installed, a time instance at which, or after which, the installation of the new encryption key is to be initiated, or other event used as a criterion for initiating the installation of the new encryption key. The server may cause the PEPs, e.g., 125a, 125b, and 125c, to install the new encryption key by sending to the PEPs, e.g., 125a, 125b, and 125c, the new encryption key, instruction to install the new encryption key, instruction to remove the respective old encryption key, an indication of a time instance at which, or after which, the encryption key may be installed, a combination thereof, or the like.

At block 330, the key server 110 causes the PEPs, e.g., 125a, 125b, and 125c, to remove, or un-install, the old decryption key when a second criterion is met. The second criterion may be the receipt of acknowledgements from all served PEPs that the new encryption key is installed and the old encryption key is removed, a time instance at which, or after which, the removal of the old decryption key is to be initiated, or other event used as a criterion for initiating the removal of the old decryption key. The key server 110 may cause the PEPs to remove the old decryption key by sending an explicit instruction to the PEPs, an indication of a time instance at which, or after which, the removal of the old decryption key is to be initiated, or the like. The removal of the old decryption key may further include removal of any other old decryption key such as other decryption key(s) that was distributed to the PEPs during another re-keying process that has not been successful or has been incomplete.

Figure 4:
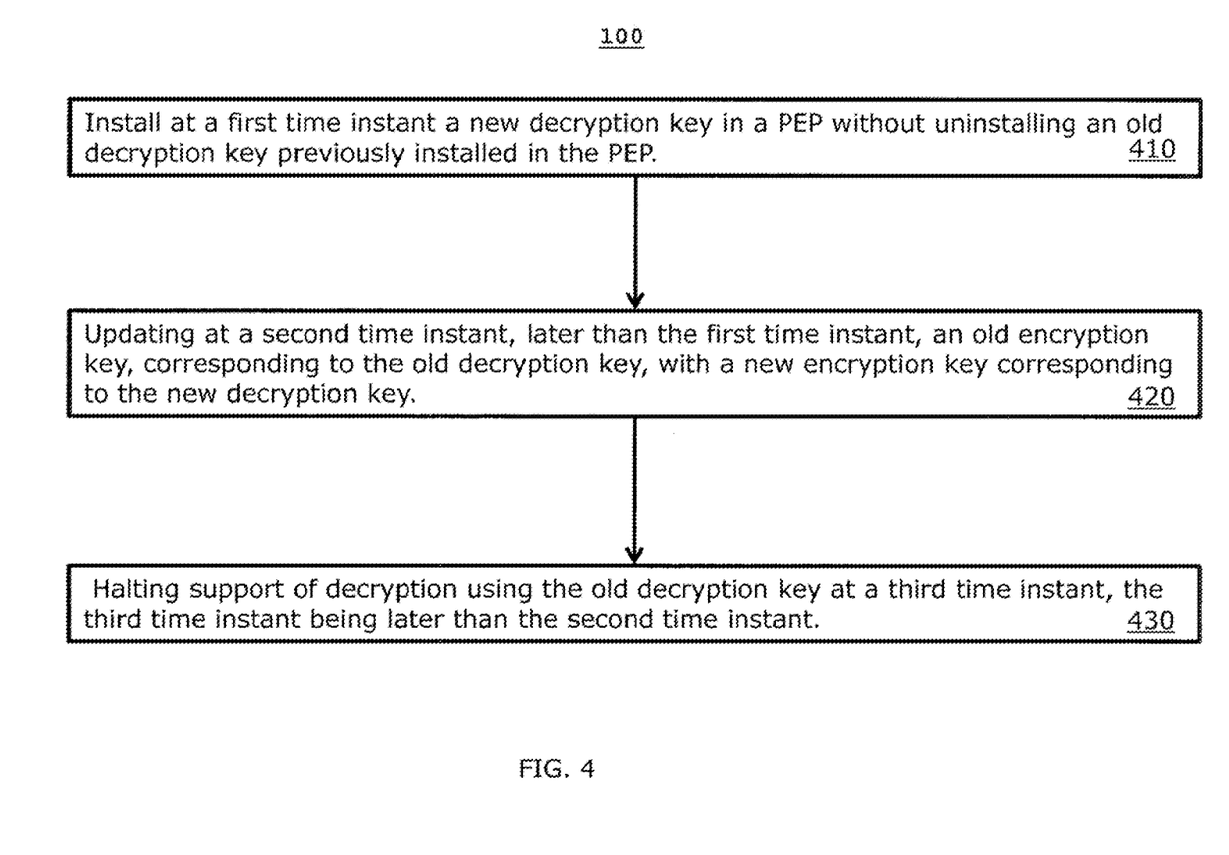
FIG. 4 is a flowchart illustrating a method of updating security keys in a policy enforcement point (PEP) according to at least one embodiment.

FIG. 4 is a flowchart illustrating a method of updating security keys in a PEP, e.g., 125a, 125b, or 125c. At block 410, the PEP installs, at a first time instance, a new decryption key received, for example, from a key server 110. The PEP installs the new decryption key without removing, or un-installing, a respective old decryption key. The installation of the new decryption key may be in response to receiving the new decryption key or receiving a respective instruction from the key server 110. The PEP may further send an acknowledgement to the key server 110 once the new decryption key is successfully installed.

At block 420, the PEP, e.g., 125*a*, 125*b*, or 125*c*, installs a new encryption key and removes, or un-installs, an old encryption key previously installed in the PEP. The installation of the new encryption key or the removal of the old encryption key is initiated at a second time instance later than the first time instance. The installation of the new encryption key or the removal of the old encryption key may be initiated in response to an instruction received from the key server 110 or receipt of the new encryption key. Alternatively, the installation of the new encryption key and removal of the old encryption key may be initiated by the PEP at a predefined time instance. An indication of the predefined time instance may be received from the key server 110. The PEP may further send an acknowledgement to the key server 110 once the new encryption key is successfully installed and the old encryption is successfully removed.

At block 430, the PEP halts support of decryption using the old decryption key at a third time instant. The third time instant is later than the second time instant. Support of decryption using the old decryption key is halted by un-installing or removing the old decryption key. The PEP also removes any other old decryption keys maintained by the PEP. The removal of old decryption key(s) may be initiated in response to an instruction received from the key server 110. The removal of old decryption key(s) may alternatively be initiated at a predefined time instance indicated by the key server 110.

It should be understood that the example embodiments described above may be implemented in many different ways. In some instances, the various methods and machines described herein may each be implemented by a physical, virtual or hybrid general purpose or application specific computer having a central processor, memory, disk or other mass storage, communication interface(s), input/output (I/O) device(s), and other peripherals. The general purpose or application specific computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., that enables the transfer of information between the elements. One or more central processor units are attached to the system bus and provide for the execution of computer instructions. Also attached to the system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a computer readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable communication and/or wireless connection.

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device. For example, a non-transient machine-readable medium may include read only memory (ROM); random access memory (RAM); magnetic disk storage media; optical storage media; flash memory devices; and others.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method of updating security keys in a group of policy enforcement points (PEPs), the method comprising:

providing a new decryption key to each PEP, and causing each PEP to support decryption using the new decryption key while still supporting decryption using an old decryption key previously installed in each PEP;

waiting until receipt of a first acknowledgement from each and every PEP in the group of PEPs, the first acknowledgement indicating that each PEP has installed and is supporting the new decryption key, and upon receipt of all the first acknowledgements, providing a new encryption key, corresponding to the new decryption key, to each PEP of the PEP group, and causing each PEP to support encryption using the new encryption key and halt support of encryption using a previously-installed old encryption key that corresponds to the old decryption key; and waiting until receipt of a second acknowledgement from each and every PEP in the group of PEPs, the second acknowledgement indicating that each PEP has installed and is supporting the new encryption key, and has halted support of encryption using the old encryption key, and upon receipt of all the second acknowledgements, causing each PEP to (i) halt support of the old decryption key and (ii) remove any decryption keys older than the new decryption key and (iii) remove any encryption keys older than the new encryption key.

2. A method according to claim 1, wherein the group of PEPs are caused to support decryption using the new decryption key while still supporting decryption using the old decryption key for a period of time; and
said causing includes:
sending the new decryption key to the group of PEPs; or
sending instruction to install the new decryption key to the group of PEPs.

3. A method according to claim 1, further including receiving an acknowledgement from each PEP of the group of PEPs indicating that the new decryption key is installed therein.

4. A method according to claim 1, further including receiving an acknowledgement from each PEP of the group of PEPs indicating that the new encryption key is installed therein.

5. A method according to claim 1, wherein causing each PEP to support encryption using the new encryption key and halt support of encryption using a previously-installed old encryption key that corresponds to the old decryption key includes:
sending the new encryption key to each PEP of the group of PEPs; or
sending instruction to install the new encryption key to each PEP of the group of PEPs.

6. An apparatus for updating security keys in a group of policy enforcement points (PEPs) comprising:
a key server; and
at least one processor operatively coupled to the key server and configured to:
provide a new decryption key to each PEP, and cause each PEP to support decryption using the new decryption key while still supporting decryption using an old decryption key previously installed in each PEP;
wait until receipt of a first acknowledgement from each and every PEP in the group of PEPs, the first acknowledgement indicating that each PEP has installed and is supporting the new decryption key, and upon receipt of all the first acknowledgements, provide a new encryption key, corresponding to the new decryption key, to each PEP of the PEP group, and cause each PEP to support encryption using the new encryption key and halt support of encryption using a previously-installed old encryption key that corresponds to the old decryption key; and
wait until receipt of a second acknowledgement from each and every PEP in the group of PEPs, the second acknowledgement indicating that each PEP has installed and is supporting the new encryption key, and has halted support of encryption using the old encryption key, and upon receipt of all the first acknowledgements, cause each PEP to (i) halt support of the old decryption key and (ii) remove any decryption keys older than the new decryption key and (iii) remove any encryption keys older than the new encryption key.

7. An apparatus as claimed in claim 6 wherein the at least one processor supports decryption at the group of PEPs by using the new decryption key while still supporting decryption using the old decryption key for a period of time; and
the key server is configured to:
send the new decryption key to the group of PEPs; or
send instruction to install the new decryption key to the group of PEPs.

8. An apparatus as claimed in claim 6 wherein the key server receives an acknowledgement from each PEP of the group of PEPs indicating that the new decryption key is installed therein.

9. An apparatus as claimed in claim 6 wherein the key server receives an acknowledgement from each PEP of the group of PEPs indicating that the new encryption key is installed therein.

10. An apparatus as claimed in claim 6 wherein the at least one processor causes each PEP of the group of PEPs to update the old encryption key with the new encryption key in response to the key server:
sending the new encryption key to the group of PEPs; or
sending instruction to install the new encryption key to the group of PEPs.

11. A computer program product updating security keys in a plurality of policy enforcement points (PEPs), comprising:
a non-transitory computer-readable medium storing computer software instructions, and
the computer software instructions when executed by a processor cause a computer system to:
providing a new decryption key to each PEP, and causing each PEP to support decryption using the new decryption key while still supporting decryption using an old decryption key previously installed in each PEP;
waiting until receipt of a first acknowledgement from each and every PEP in the group of PEPs, the first acknowledgement indicating that each PEP has installed and is supporting the new decryption key, and upon receipt of all the first acknowledgements, providing a new encryption key, corresponding to the new decryption key, to each PEP of the PEP group, and causing each PEP to support encryption using the new encryption key and halt support of encryption using a previously-installed old encryption key that corresponds to the old decryption key; and
waiting until receipt of a second acknowledgement from each and every PEP in the group of PEPs, the second acknowledgement indicating that each PEP has installed and is supporting the new encryption key, and has halted support of encryption using the old encryption key, and upon receipt of all the second acknowledgements, causing each PEP to (i) halt support of the old decryption key and (ii) remove any decryption keys older than the new decryption key and (iii) remove any encryption keys older than the new encryption key.

* * * * *